United States Patent
Vierkotten et al.

(10) Patent No.: US 9,856,662 B2
(45) Date of Patent: Jan. 2, 2018

(54) MOBILE LARGE MANIPULATOR

(71) Applicant: SCHWING GMBH, Herne (DE)

(72) Inventors: Reiner Vierkotten, Oberhausen (DE); Joseph Schnittker, Dortmund (DE)

(73) Assignee: SCHWING GmbH, Herne (DE)

( * ) Notice: Subject to any disclaimer, the term of this patent is extended or adjusted under 35 U.S.C. 154(b) by 0 days.

(21) Appl. No.: 15/321,444

(22) PCT Filed: Jun. 24, 2015

(86) PCT No.: PCT/EP2015/064281
§ 371 (c)(1),
(2) Date: Dec. 22, 2016

(87) PCT Pub. No.: WO2015/197708
PCT Pub. Date: Dec. 30, 2015

(65) Prior Publication Data
US 2017/0167149 A1    Jun. 15, 2017

(30) Foreign Application Priority Data
Jun. 25, 2014   (DE) .................. 10 2014 009 165

(51) Int. Cl.
*G06F 19/00*   (2011.01)
*E04G 21/04*   (2006.01)
(Continued)

(52) U.S. Cl.
CPC ........ *E04G 21/0463* (2013.01); *B66C 15/045* (2013.01); *B66C 23/78* (2013.01);
(Continued)

(58) Field of Classification Search
CPC ............ E04G 21/0463; E04G 21/0436; E04G 21/0445; B66C 15/045; B66C 23/78
(Continued)

(56) References Cited

U.S. PATENT DOCUMENTS

| 7,657,355 B2 * | 2/2010 | Rau | B66C 13/40 |
| | | | 37/348 |
| 8,145,394 B2 * | 3/2012 | Chiorean | E02F 3/435 |
| | | | 701/33.1 |

(Continued)

FOREIGN PATENT DOCUMENTS

| EP | 1356910 | * | 4/2003 |
| EP | 1356910 A1 | | 10/2003 |
| EP | 2038493 A1 | | 3/2009 |

OTHER PUBLICATIONS

International Search Report translation, issued in International Application No. PCT/EP2015/064281, dated Sep. 9, 2015, 2 pages.

*Primary Examiner* — Muhammad Shafi
(74) *Attorney, Agent, or Firm* — Faegre Baker Daniels LLP

(57) ABSTRACT

A large manipulator includes a chassis, at least two front support arms, and at least two rear support arms. The support arms are coupled to corresponding extendable support legs that are each coupled to the chassis and that are each configured to be extended between a travel position and a support position. The large manipulator further includes a mast arm with a turntable coupled to the chassis. An operating range of the mast arm is dependent upon the support positions of the extendable support arms. The large manipulator further includes a computer with a monitor and a program-controlled positioning aid. The positioning aid is configured to generate a graphical representation of surrounding image data on the monitor. The operating range of the mast arm is visualized in the graphical representation.

13 Claims, 5 Drawing Sheets

(51) Int. Cl.
  *B66C 15/04*   (2006.01)
  *B66C 23/78*   (2006.01)
(52) U.S. Cl.
  CPC ..... *E04G 21/0436* (2013.01); *E04G 21/0445* (2013.01); *B64C 2201/127* (2013.01)
(58) Field of Classification Search
  USPC .......................................................... 701/50
  See application file for complete search history.

(56) References Cited

U.S. PATENT DOCUMENTS

| | | | | |
|---|---|---|---|---|
| 8,483,915 | B2* | 7/2013 | Lanzl | E02D 7/16 |
| | | | | 701/50 |
| 8,915,308 | B2* | 12/2014 | Joergensen | E02F 3/845 |
| | | | | 172/4 |
| 2009/0283163 | A1* | 11/2009 | Wehner | B66C 23/78 |
| | | | | 137/615 |
| 2011/0270494 | A1* | 11/2011 | Imhof | A01D 57/20 |
| | | | | 701/50 |
| 2014/0096853 | A1* | 4/2014 | Neubert | E04G 21/0418 |
| | | | | 137/615 |

* cited by examiner

MOBILE LARGE MANIPULATOR

TECHNICAL FIELD

The invention concerns a mobile large manipulator as well as a method for the program-controlled assistance of the positioning of a large manipulator.

BACKGROUND OF THE INVENTION

Large manipulators are known from the prior art (see, e.g., EP 2 038 493 B1). In particular, they comprise a chassis, two front and two rear support arms that can be supported on a base surface by way of extendable support legs, which are arranged on the chassis and can be extended entirely or partly from a travel position to a support position, and a foldout mast arm, which has a turntable able to pivot around a vertical axis and a plurality of mast segments which are hinged to each other.

With fully extended and propped up support arms, a rotation of the fully unfolded mast arm through 360° is usually possible. Thus, on the whole, it is possible to achieve a circular range around the large manipulator with the mast arm without the danger of the large manipulator tipping over. Depending on the length of the arm, it is thus possible to deliver slurry at a radius of 70 meters or more. However, it is often the case that the support arms cannot be fully extended, since the places of use of the large manipulators are often too narrow. For example, there are obstacles at the site of use or the ground is not strong enough to support the machine. In these cases, only a partial supporting of the large manipulator is possible. Then, for example, only the front, the side, or three of the four support arms can be fully extended and propped up. The other support arms are only extended into a shortened extension position or even remain entirely in their folded-up position. As a whole, this results in a restricted operating range of the mast. If this operating range of the mast is exceeded, the danger exists of the large manipulator tipping over. Depending on the support configuration used, different swivel ranges of the mast will result, in which the mast can be positioned without the truck-mounted concrete pump tipping over.

The problem still occurs for the machine operator when driving up to a concrete laying site of finding a suitable operating position of the large manipulator, so that the concrete laying surface can be optimally reached with the mast arm. It is very difficult to assess a suitable operating position. It requires much experience on the part of the machine operator as well as good knowledge of the surroundings, such as information about the ground quality. This is further aggravated when the angle of rotation or the swivel range of the mast arm is restricted by partial supporting. Often, therefore, time-consuming repositioning of the machine is necessary, or the concrete must be brought in another way by the laborers at the construction site to the place of use. Due to the resulting delays, an ideal concrete laying can no longer be assured, since there is the danger that the concrete will set and may clog the concrete pump.

The positioning of the large manipulators known from the prior art is done on the basis of the experience of the machine operator, who can at most resort to diagrams showing the possible angles of rotation of the folding mast for different support variants. The machine operator positions the machine in the estimated position and props it up there. The drawback of the known large manipulators is that a suitable operating position with which the concrete laying surface is optimally reached with the mast arm can only be estimated in this way. Therefore, an optimal operating position is seldom found during the first approach, so that at least one time-consuming repositioning is required.

SUMMARY OF THE INVENTION

Thus, the problem which the invention proposes to solve is to provide a mobile large manipulator which allows the machine operator to find an optimal operating position so that the large manipulator can reach the concrete laying surface as optimally and completely as possible with an extendable support configuration at the concrete laying site.

This problem is solved by a large manipulator with the features of the appended claims. It should be noted that the individually mentioned features in the claims can also be combined with each other in any desired and technologically meaningful manner and will thus indicate further embodiments of the invention.

A mobile large manipulator according to the invention has a chassis, two front and two rear support arms that can be supported on a base surface by way of extendable support legs, which are each arranged on the chassis and can be extended entirely or partly from a travel position to a support position, and a foldout mast arm, which has a turntable arranged on the chassis so as to be able to pivot around a vertical axis and a plurality of mast segments which are hinged to each other. The operating range of the mast arm, i.e., the range which can be reached with the tip of the mast arm, is dependent upon the support configuration of the support arms. The operator of the large manipulator can choose, for example, from a plurality of possible support configurations, which each specify the support positions of the support arms. The large manipulator according to the invention is characterized by a program-controlled positioning aid, which is adapted to put out a graphical representation of surrounding image data on a monitor screen, wherein the operating range of the mast arm is visualized in the graphical representation.

Thanks to the large manipulator according to the invention, a graphical representation of the construction site and the surroundings is displayed with the position of the large manipulator and the operating range covered by it for a particular support configuration, and this preferably even before the machine operator finally parks the machine and extends the support arms.

In this process, the operator of the large manipulator can test out various support configurations, for example, by entering them and checking the overlapping of the operating range resulting for the particular support configuration and, for example, a concrete laying site which needs to be achieved. Only when the suitable positioning and support configuration has been found does the operator extend the support arms in accordance with the chosen support configuration.

Alternatively, the operator may specify, for example, a desired operating range of the mast arm, resulting in a support configuration of the large manipulator that can also be represented on the monitor screen. Thus, the operator can determine whether the operating range of the mast arm can even be covered at the intended set-up location of the large manipulator with the necessary support configuration, e.g., under tight space conditions.

Thus, the invention has the advantage over the prior art that the machine operator can see already before the final parking and supporting of the large manipulator whether he can reach the target zone, especially all concrete laying points at the construction site, from his selected parking location and with his chosen support configuration, or whether he must or should set up the large manipulator in a different position with, for example, a different support configuration in order to be able to better or completely reach the target zone. Thanks to the invention, a time-consuming repositioning of the large manipulator can be avoided. Thus, on the whole, the best possible concrete laying can be assured.

The visualization of the surroundings furthermore makes it possible for the machine operator to obtain an optimal panoramic view of the construction site. For this, the positioning aid can be adapted so that a graphical representation of the operating range is overlaid with the graphical representation of the surroundings of the mobile large manipulator for the visualization of the operating range. The graphical representation of the surrounding image data can advantageously be done such that the large manipulator is seen on the monitor screen from above, i.e., from a bird's eye perspective, together with its surroundings in proper position, i.e., in correct relative spatial arrangement and also in the most realistic size relations possible. In this way, it is easier for the machine operator to recognize whether sufficient room remains or is present for a truck mixer, for example when setting up a truck-mounted concrete pump.

The graphical representation of the surroundings can be done in various ways. Preferably, the large manipulator comprises at least one camera, which records the surrounding image data. The positioning aid is designed so that it processes the surrounding image data, e.g., in order to convert it according to the desired representation perspectives, and puts it out on the monitor screen.

Advantageously, the at least one camera is arranged on the turntable. The turntable constitutes the midpoint of the mast arm and thus also the midpoint of the operating range. There can also be two cameras arranged on the turntable. These are then arranged preferably at the right and left side of the turntable.

A large manipulator according to the invention preferably comprises at least one camera on all four sides. Advantageously, one camera each is arranged in front, at the back, on the left side and on the right side of the large manipulator. Ideally, the pictures of the cameras can be superimposed by computer, so that a 360° panoramic view around the vehicle is obtained. The cameras can be arranged on the chassis or on the driver cabin of the large manipulator. In this way, the cameras can easily be connected in wired or wireless manner to a central control unit. One limitation here is that, due to the low placement on the large manipulator, the cameras can only display a relatively small part of the surroundings.

In order to improve the range of the cameras, at least one camera can also be arranged on the mast arm. Thanks to the improved range, the machine operator obtains a better overview of the construction site. This is especially important in that, due to the increasingly bigger large manipulators, the delivery range is also constantly growing and the machine operator must fully grasp this in order to enable an optimal orientation of the large manipulator at the construction site. In order to be able to avoid a costly wiring of the cameras, the cameras are preferably connected by a radio link to the positioning aid.

Ideally, at least one camera is arranged as high as possible on the top of the large manipulator. The camera can be arranged on an upwardly extendable or swivelable camera boom, preferably disposed on the turntable. Depending on the circumstances, the camera boom can then be extended or swiveled upward as far as is needed.

The large manipulator according to the invention can have a camera with 360° panoramic view. Advantageously, a costly computerized overlaying of pictures of different cameras will not be necessary here. The machine operator obtains a constant representation of the construction site surroundings. The best representation is achieved when the camera with 360° panoramic view is linked to the highest possible point on the large manipulator.

It is also conceivable for the camera to be disposed on an unmanned aircraft, such as a drone, which can be steered by the operator. The camera ideally communicates with the positioning aid for wireless transmittal of the surrounding image data. It can transmit the pictures by radio to the positioning aid. In this way, an especially good representation of the surroundings can be obtained. The camera is preferably disposed on the underside of the aircraft. The aircraft is launched from the large manipulator or next to the large manipulator. An image of the construction site is then composed as centrally as possible above the turntable and thus at the midpoint of the operating range and transmitted to the positioning aid.

Ideally the positioning aid has a data memory, in which the surrounding image data is stored. The positioning aid can likewise have a communication interface to a data network and be designed to transmit via the communication interface the surrounding image data. One way of obtaining a graphical representation of the construction site/surroundings without requiring costly camera technology is the use of satellite or aerial photographs (such as "Google Maps" or "Google Earth"), which are transmitted via the communication interface to the positioning aid, or map materials of a navigation system, which are stored beforehand in the data memory of the positioning aid. But since the data of such systems often does not portray the current circumstances, and this is especially true of regions not of great importance to the public and thus not regularly revised, it is advantageous for the satellite/aerial photographs or the map materials to be overlaid with currently produced camera pictures, at least for the near zone around the large manipulator.

The positioning aid is preferably designed so that it puts out the surrounding image data corresponding to the momentary position and orientation of the large manipulator so that the surroundings are displayed on the monitor screen in the correct relative position to the large manipulator on the monitor screen. Ideally, the large manipulator comprises a location receiver and/or compass connected to the positioning aid for the determination of the momentary position and/or orientation of the large manipulator. This may involve one or more GPS position receivers, for example, preferably used in combination with a compass. In this way, the position of the large manipulator will be detected and also displayed on the monitor screen when putting out the graphical representation of the surrounding image data.

Ideally, the positioning aid is designed for the entering of a target zone via the monitor screen and for the determining of a positioning recommendation such that the target zone in the recommended positioning of the large manipulator lies within the operating range. By target zone is meant according to the invention preferably the surface which should be reached with the large manipulator. Especially preferably, it means the concrete laying surface.

Preferably the monitor screen is designed as a touchscreen. The touchscreen is advantageously placed in the area of the dashboard of the driver cabin. The monitor screen is ideally two-part, having an entry and a display unit. On one side, the entry side, the operator can enter the desired support configuration. On the other side, the surroundings are represented. The graphical representation of the surroundings can then be overlaid with the position of the large manipulator and the operating range covered by it and put out. The mutual arrangement of the entry and display may vary. It is also conceivable to only show the entry region temporarily for purposes of the entry, as is known for the user interfaces of smartphones.

According to the invention, the user can also have the option of himself selecting a target zone, such as a concrete laying surface. For this, using his finger or a stylus he will draw on the touch-sensitive monitor screen the outlines of the concrete laying surface. After this, the positioning aid computes the optimal positioning. The computation is done optionally taking into account the recognized or entered local limitations. The positioning aid can furthermore also indicate a suitable and possible support configuration for this. Moreover, the positioning aid can then also guide the machine operator with the large manipulator to the optimal set-up location. Advantageously, information about the support configuration and the description of the path to the optimal set-up location is put out on the monitor screen.

The subject matter of the present invention is also a method. The method according to the invention for the program-controlled assistance of the positioning of a large manipulator includes the following steps:
determination of a support configuration, wherein the support configuration indicates the support positions of support arms of the large manipulator, and
putting out of a graphical representation of surrounding image data, wherein the operating range of a mast arm of the large manipulator corresponding to the support configuration is visualized in the graphical representation.

Thanks to the method according to the invention, a graphical representation of the construction site and the surroundings is displayed with the operating range covered and optionally overlaid one on the other, even before the machine operator finally sets up the machine.

It is possible in this case for the operator to specify a desired operating range, from which a necessary support configuration for this will result, such that the large manipulator is securely supported in all positions of the mast arm within the operating range, or the operator specifies a desired support configuration or one which is possible at the set-up location, from which the possible operating range of the mast arm is then derived for the visualization.

The invention as well as its technical field will now be explained more closely with the aid of the figures. It should be noted that the figures show an especially preferred variant embodiment of the invention. However, the invention is not limited to the variant embodiment shown. In particular, the invention encompasses any given combinations of the technical features indicated in the claims or described as being relevant to the invention in the description, as long as they are technically feasible.

BRIEF DESCRIPTION OF THE DRAWINGS

There are shown.

DETAILED DESCRIPTION

Figure 1:
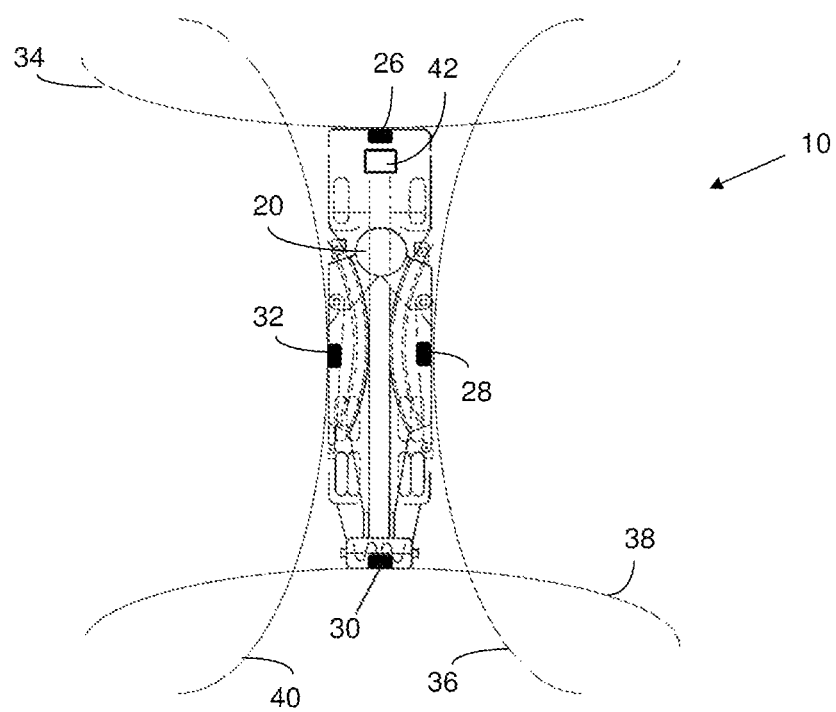
FIG. 1, a schematic top view of a large manipulator according to the invention in a first embodiment,
FIG. 2, a schematic side view of a large manipulator according to the invention as per FIG. 1,
FIG. 3, a schematic side view of a large manipulator according to the invention in a second embodiment,
FIG. 4, a schematic top view of a large manipulator according to the invention in a third embodiment,
FIG. 5, a schematic side view of a large manipulator according to the invention as per FIG. 4,
FIG. 6, a schematic side view of a large manipulator according to the invention in a fourth embodiment,
FIG. 7, a schematic side view of a large manipulator according to the invention in a fifth embodiment,
FIG. 8, a schematic view of a touchscreen in one embodiment according to the invention,
FIG. 9a, a representation of a graphical overlaying of surrounding image data, operating range and position of a large manipulator in a first embodiment,
FIG. 9b, a representation of a graphical overlaying of surrounding image data, operating range and position of a large manipulator in a second embodiment.

FIG. 1 shows a top view of a large manipulator 10 according to the invention in a first embodiment. The large manipulator 10 comprises a chassis 12, two front 14 and two 16 rear support arms which can be supported on a base surface by way of extendable support legs, which are arranged on the chassis and can be fully or partly extended from a travel position to a support position, and a foldout mast arm 18, having a turntable 20 which can pivot around a vertical axis and a plurality of mast segments hinged to each other. Moreover, the large manipulator 10 has a program-controlled positioning aid, with which it is possible to put out a graphical representation of surrounding image data on a monitor screen 42, the operating range of the mast arm 18 being also visualized.

The operator of the large manipulator for example can first specify a desired operating range 60 of the mast arm 18, which then necessitates a particular support configuration. In the visualization, the large manipulator 10 is then visualized with the corresponding support configuration and the operating range 60 of the mast arm, so that the operator can recognize whether the necessary support configuration can be used for the chosen operating range 60 at the construction site, especially when space conditions are tight. Once the operator has determined with the aid of the visualization the optimal set-up location for the large manipulator 10, he sets up the large manipulator 10 at this set-up location with the necessary support configuration and checks through suitable sensors whether the required support configuration for the desired operating range 60 is accomplished with the support arms. During the concrete laying, a sensor on the mast arm then constantly checks the position of the mast arm and limits or halts its movement when the boundaries of the selected operating range 60 are reached.

In the sensory verification of the support configuration, the actual support configuration (extension length/unfolding angle of the support arms 14, 16) is critical. If the specified operating range 60 necessitates that a given support arm must only be halfway (50%) extended, for example, but the set-up location enables a further extension (such as two thirds), the mast arm movement is enabled and a larger operating range 60 for the mast arm may also be enabled.

Alternatively, the operator may first of all specify a support configuration, which is possible at the construction site, so far as is evident, perhaps with assistance from the visualization on the monitor screen, after which the positioning aid calculates and visualizes the possible operating range for the chosen support configuration, so that the operator can ascertain whether all points of a concrete laying site can be reached with this operating range.

The graphical representation of the surroundings is done preferably by cameras 26, 28, 30, 32, 44, wherein the positioning aid is adapted so that it processes the surrounding image data and puts it out on the monitor screen 42. Advantageously, the large manipulator 10 has at least one camera on all four sides: front 26, right side 28, rear 30 and left side 32. Each of the cameras 26, 28, 30, 32 covers a visual range 34, 36, 38, 40. Ideally, the pictures of the cameras 26, 28, 30, 32 can be superimposed by computer, so that a 360° panoramic view around the large manipulator 10 is obtained.

Figure 2:
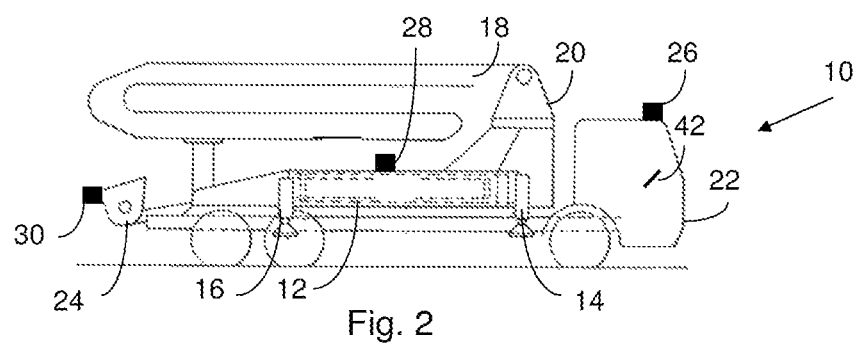

FIG. 2 shows a schematic side view of the large manipulator 10 according to the invention in the first embodiment as per FIG. 1. The cameras 26, 28, 30, 32 are arranged on the chassis 12 or on the driver cabin 22 of the large manipulator. In this way, the cameras 26, 28, 30, 32 can easily be connected to the positioning aid by cables.

Figure 3:
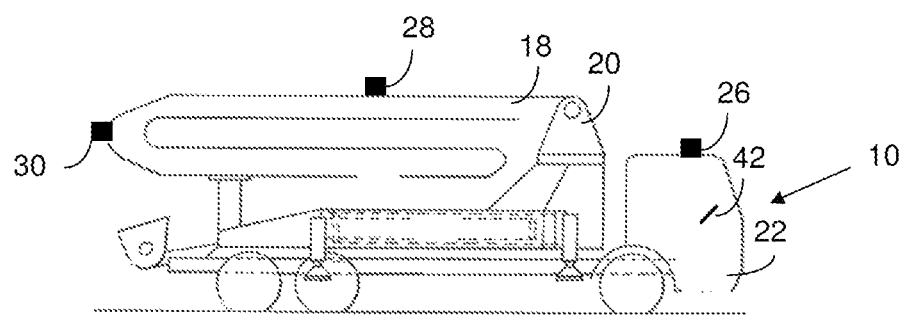

FIG. 3 shows a schematic side view of a large manipulator 10 according to the invention in a second embodiment. In order to improve the range of the cameras 26, 28, 30, 32, they are arranged here as far up as possible on the large manipulator 10. The front camera 26 is arranged on the driver cabin 22, the other three cameras 28, 30, 32 are arranged on the mast arm 18. Thanks to such an arrangement of the cameras 26, 28, 30, 32, the machine operator obtains a better overview of the construction site. In order to be able to dispense with a costly use of cables for the cameras 26, 28, 30, 32, the cameras 26, 28, 30, 32 are preferably linked by a radio connection to the positioning aid.

Figure 4:
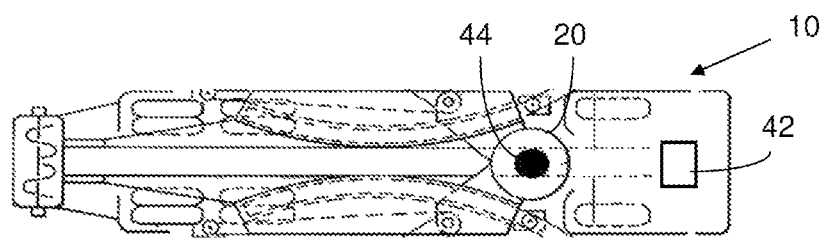

FIG. 4 shows a schematic top view of a large manipulator 10 according to the invention in a third embodiment. The camera 44 is arranged on the turntable 20. The turntable 20 constitutes the midpoint of the mast arm 18 and thus also the midpoint of the operating range 60.

Ideally the camera 44 is a camera with 360° panoramic view. Advantageously, a costly computerized superimposing of pictures of different cameras is unnecessary here. Two cameras can also be arranged on the turntable 20. These are then preferably arranged at the sides, the right and left side of the turntable 20.

Figure 5:
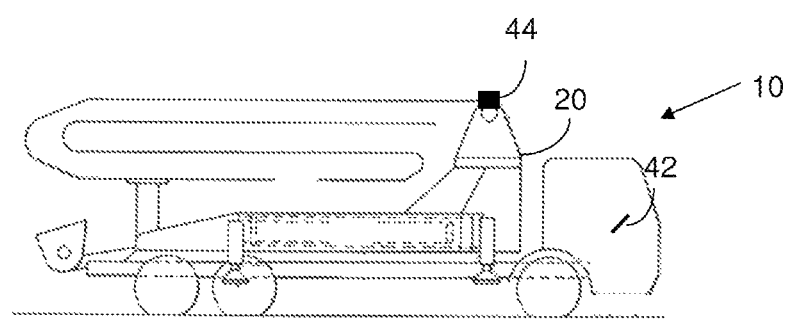

FIG. 5 shows a schematic side view of a large manipulator 10 according to the invention in the third embodiment as per FIG. 4. The 360° camera 44 is arranged on the turntable 20.

Figure 6:
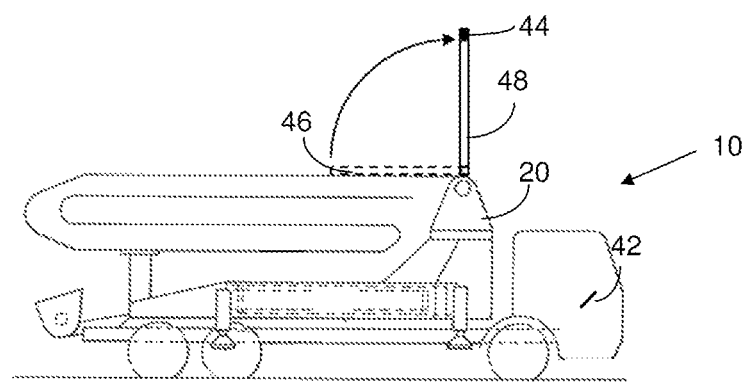

FIG. 6 shows a schematic side view of a large manipulator 10 according to the invention in a fourth embodiment. One camera 44 is arranged on an upwardly swiveable camera boom 46, 48, located on the turntable 20. The camera boom is able to change from a folded-up position 46, in which the camera 44 is situated at the height of the turntable 20, to an unfolded position 48. In the unfolded position 48, the camera 44 projects upward beyond the large manipulator 10. Depending on the circumstances, the camera boom 48 can be swiveled far enough upward. In place of the swiveable camera boom 46, 48, a carrier for the camera 44 which can move telescopically upward to a sufficient height would also be conceivable.

Figure 7:
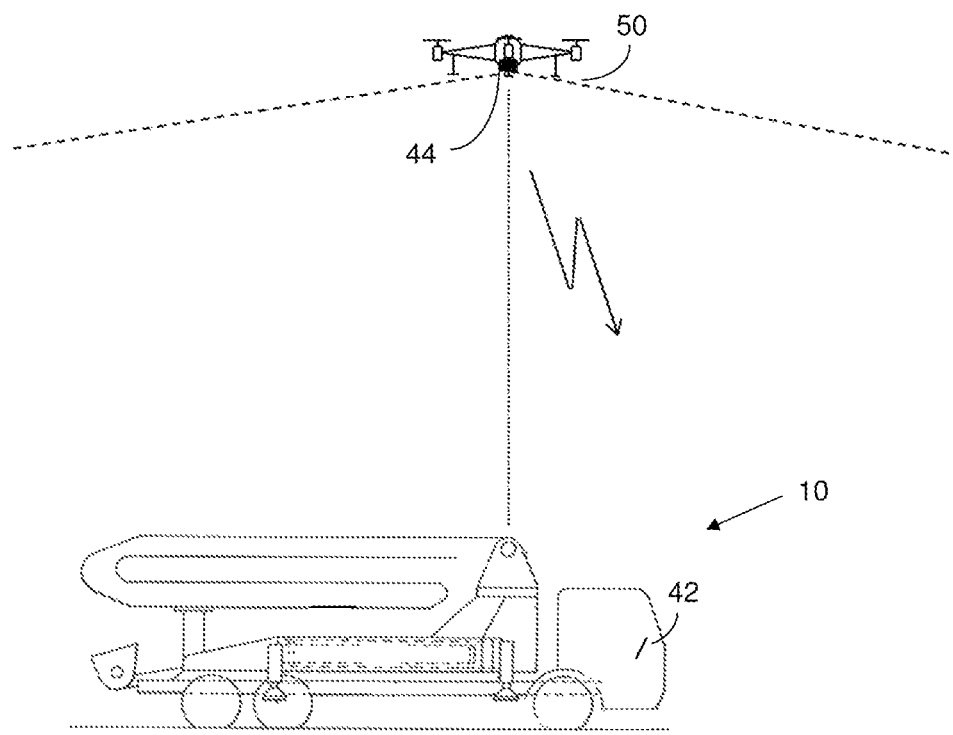

FIG. 7 shows a schematic side view of a large manipulator 10 according to the invention in a fifth embodiment. The camera 44 is arranged on an unmanned aircraft 50, such as a drone, which can be steered by the operator. The camera 44 communicates ideally with the positioning aid wirelessly for transmittal of the surrounding image data. The camera 44 can transmit the image data recorded to the positioning aid by radio. The camera 44 is preferably arranged on the underside of the aircraft 50. The aircraft 50 is launched from the large manipulator 10 or alongside the large manipulator 10. An image of the construction site is then composed as centrally as possible above the turntable 20 and transmitted to the positioning aid.

Figure 8:
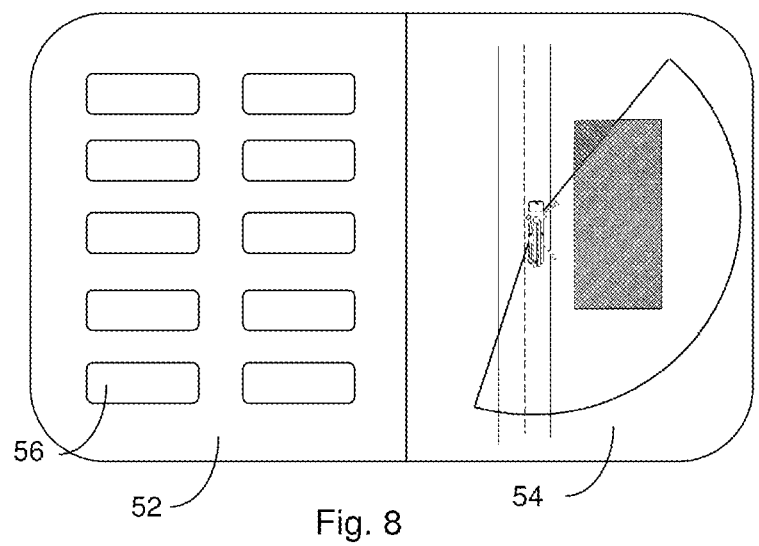

FIG. 8 shows a schematic view of a monitor screen/touchscreen 42 of the inventive positioning aid in one embodiment. The monitor screen 42 is two-part. At the right side is arranged the display 54 and at the left side the entry 56. The entry 56 can comprise a plurality of operating buttons 56, by which the machine operator can select various predefined support configurations. Alternatively, the machine operator can also select various, possibly predefined operating ranges 60 of the mast arm, necessitating different support configurations each time, which are then represented on the monitor screen. The display 54 shows a graphical representation of surrounding image data which is preferably recorded by cameras, as described above. Alternatively or additionally, satellite or aerial photographs stored in memory or downloaded from the Internet can be represented. This image is overlaid with the position of the large manipulator 10 with selected support configuration or selected operating range 60 of the mast arm 18, based on the support configuration selected at the left side or the selected/predetermined operating range.

The operating range of the large manipulator in different support configurations can basically be determined in two different ways. In the above example with the selection of a support configuration, the operating range is stored in a memory or a table for the possible, selectable support configurations and when one support configuration is selected the corresponding operating range will be read out from the table and displayed on the touchscreen. In this case, the machine operator can only choose between predefined support configurations, for which individual supports are only fully extended or not extended at all, or only 50% extended, for example.

If the machine operator should also have the ability to individually extend the supports in every possible intermediate position, it is necessary to perform a center of gravity computation, so that when determining the operating range the range which can be reached by the tip of the mast arm is computed in which the center of gravity of the large manipulator is situated within a supporting rectangle defined by the positions of the support legs in the specified support configuration.

In both variants, the machine operator is only shown the operating range of the large manipulator or the mast arm in which the positional stability of the large manipulator is assured and the danger of tipping over does not exist.

Figure 9A:
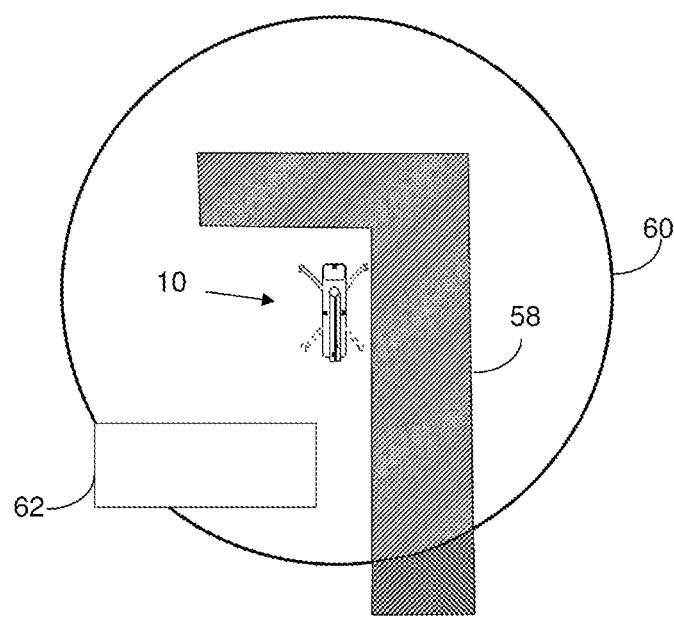

FIG. 9a shows a representation of a graphical overlaying of surrounding image data, the operating range 60 of the mast arm 18 and the position of the large manipulator 10 in a first embodiment, such as can be put out by the display 54. With the large manipulator 10 depicted, concrete is to be laid on an L-shaped surface 58. In the immediate proximity of the L-shaped surface 58 there is an obstacle 62. Given full supporting of the large manipulator 10 with circumventing of the obstacle, as has been selected in FIG. 9a, only a partial area of the concrete laying surface 58 can be reached. If the machine operator were to set up the large manipulator 10 in this position, a repositioning of the large manipulator 10 would be unavoidable or concrete would have to be brought in another way to the areas which cannot be reached.

Figure 9B:
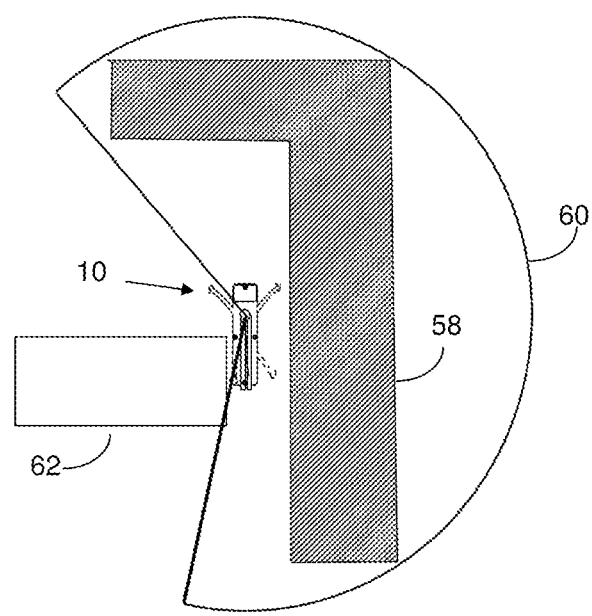

FIG. 9b likewise shows a representation of a graphical overlaying of surrounding image data, the operating range 60 of the mast arm 18 and the position of the large manipulator 10. As in FIG. 9a, concrete is supposed to be laid on an L-shaped surface 58 here as well. The large manipulator 10 is situated between the obstacle 62 and the L-shaped concrete laying surface 58. Since only a partial supporting is possible on account of the obstacle and only the right support arms can be extended, the operating range 60 is limited. The mast arm 18 cannot travel about 360°, without a danger of the large manipulator 10 tipping over. Yet a complete coverage of the concrete laying surface 58 by the mast arm 18 is still possible. Thus, the machine operator would at this place bring the support arms 14, 16 into the support configuration selected or derived from the operating range 60. After this, the laying of the concrete could begin.

The program-controlled positioning aid proposed according to the invention can be realized in one practical embodiment as a computer of the usual kind installed in the large manipulator (with processor, RAM, data bus, etc.) with suitable input and output interfaces for monitor screen, sensors, cameras, entry buttons or the like. The positioning aid is given its set-up according to the invention by appropriate software. The software can be stored in the RAM or in a non-volatile storage means of the positioning aid.

LIST OF REFERENCE NUMBERS

10 Large manipulator
12 Chassis
14 Front support arms
16 Rear support arms
18 Mast arm
20 Turntable
22 Driver cabin
24 Slurry pump
26 Front camera
28 Right side camera
30 Rear camera
32 Left side camera
34 Visual range of front camera
36 Visual range of right camera
38 Visual range of rear camera
40 Visual range of left camera
42 Monitor screen/touchscreen
44 360° camera
46 Camera boom (folded up)
48 Camera boom (unfolded)
50 Drone
52 Entry
54 Display
56 Operating buttons
58 Target zone/surface to be laid with concrete
60 Operating range
62 Obstacle

The invention claimed is:

1. A large manipulator comprising:
a chassis;
at least two front support arms and at least two rear support arms coupled to corresponding extendable support legs that are each coupled to the chassis and that are each configured to be extended between a travel position and a support position;
a mast arm including a turntable coupled to the chassis so as to be able to pivot around a vertical axis and including a plurality of mast segments coupled to each other, wherein an operating range of the mast arm is dependent upon the support positions of the extendable support arms; and
a computer including a monitor and a program-controlled positioning aid, the positioning aid configured to generate a graphical representation of surrounding image data on the monitor, wherein the operating range of the mast arm is visualized in the graphical representation, wherein the positioning aid is further configured to overlay a graphical representation of the operating range in correct position with the graphical representation of the surroundings of the large manipulator for the visualization of the operating range.

2. The large manipulator of claim 1, further comprising:
at least one camera configured to record the surrounding image data, wherein the positioning aid is configured to process the surrounding image for display on the monitor.

3. The large manipulator of claim 2, wherein one of the at least one cameras is arranged on the turntable.

4. The large manipulator of claim 2, wherein the at least one camera includes a front camera arranged on a front of the large manipulator, a back camera arranged on a back of the large manipulator, a left-side camera arranged on a left side of the large manipulator, and a right-side camera arranged on a right side of the large manipulator.

5. The large manipulator at claim 2, wherein one of the at least one cameras is arranged on the mast arm.

6. The large manipulator of claim 2, wherein one of the at least one cameras is arranged on an upwardly extendable or swivelable camera boom.

7. The large manipulator of claim 1, wherein the computer includes a data memory in which the surrounding image data is stored.

8. The large manipulator of claim 7, wherein the computer further includes a communication interface configured to communicate the surrounding image data to a data network.

9. The large manipulator of claim 8, wherein the positioning aid is configured to generate the surrounding image data corresponding to the momentary position and orientation of the large manipulator so that the surroundings are displayed on the monitor in the correct relative position to the large manipulator on the monitor.

10. The large manipulator of claim 9, further comprising:
a location receiver and/or compass coupled to the computer, wherein the location receiver is configured to determine a momentary position of the large manipulator, and wherein the compass is configured to determine orientation of the large manipulator.

11. The large manipulator of claim 10, wherein the computer is further configured to receive, via the monitor, input indicating a target zone for the determining of a positioning recommendation such that the target zone in the recommended positioning of the large manipulator lies within the operating range.

12. The large manipulator of claim 11, wherein the monitor is a touchscreen monitor.

13. A large manipulator comprising:
a chassis;
at least two front support arms and at least two rear support arms coupled to corresponding extendable support legs that are each coupled to the chassis and that are each configured to be extended between a travel position and a support position;
a mast arm including a turntable coupled to the chassis so as to be able to pivot around a vertical axis and including a plurality of mast segments coupled to each other, wherein an operating range of the mast arm is dependent upon the support positions of the extendable support arms; and
means for generating a graphical representation of surrounding image data and the operating range of the mast arm wherein the means for generating a graphical representation comprises a monitor and a program-controlled positioning aid, wherein the positioning aid is further configured to overlay a graphical representation of the operating range in correct position with the graphical representation of the surroundings of the large manipulator for the visualization of the operating range.

* * * * *